(12) United States Patent
Choi et al.

(10) Patent No.: US 11,632,416 B2
(45) Date of Patent: Apr. 18, 2023

(54) METHOD AND SYSTEM FOR DISTRIBUTING APPLICATION FOR EDGE COMPUTING DEVICES

(71) Applicant: SAMSUNG SDS CO., LTD., Seoul (KR)

(72) Inventors: Hyo Keun Choi, Seoul (KR); Eun Sol Shim, Seoul (KR); Kyu Yull Yi, Seoul (KR); Jin Hyuk Park, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 0 days.

(21) Appl. No.: 17/078,428

(22) Filed: Oct. 23, 2020

(65) Prior Publication Data

US 2021/0409478 A1 Dec. 30, 2021

(30) Foreign Application Priority Data

Jun. 30, 2020 (KR) .......................... 10-2020-0079847

(51) Int. Cl.
*H04L 67/02* (2022.01)
*H04L 67/1097* (2022.01)
(Continued)

(52) U.S. Cl.
CPC .............. *H04L 67/02* (2013.01); *G06F 9/505* (2013.01); *G06F 11/3006* (2013.01); *G06F 11/3688* (2013.01); *G06F 11/3692* (2013.01); *H04L 41/0893* (2013.01); *H04L 43/0811* (2013.01); *H04L 67/1097* (2013.01); *H04L 67/148* (2013.01); *H04L 67/5682* (2022.05); *H04L 67/63* (2022.05)

(58) Field of Classification Search
CPC ......... H04L 67/02; H04L 67/10; H04L 67/12; H04L 67/26; H04L 67/63; H04L 67/148; H04L 67/327; H04L 67/1004; H04L 67/1097; H04L 67/2482; H04L 67/2852; H04L 67/5682; H04L 41/0893; H04L 43/065; H04L 43/0811; H04L 43/0858; H04L 65/1083; G06F 16/95; G06F 9/46; G06F 9/50; G06F 9/505; G06F 11/30; G06F 11/36; G06F 11/3006; G06F 11/3688; G06F 11/3692; G06F 3/0601; G06F 12/12; H04W 36/0005
USPC ........................................................ 709/203
See application file for complete search history.

(56) References Cited

U.S. PATENT DOCUMENTS 11,138,035 B1 * 10/2021 Parulkar ............. G06F 9/45558
11,171,850 B2 * 11/2021 Yi ....................... H04L 43/0888
(Continued)

FOREIGN PATENT DOCUMENTS

KR 10-2033339 B1 10/2019

*Primary Examiner* — James N Fiorillo
(74) *Attorney, Agent, or Firm* — The PL Law Group, PLLC

(57) ABSTRACT

A method for distributing an application for an edge computing device performed by a computing device according to an embodiment of the present invention includes selecting a cluster including two or more edge devices from among a plurality of edge devices, distributing a first application to a second edge device included in the cluster, modifying routing information such that a service request incoming to a first edge device included in the cluster is transmitted to the second edge device, and replacing the first application running in the first edge device with a second application.

19 Claims, 11 Drawing Sheets

(51) Int. Cl.
   *G06F 11/36*      (2006.01)
   *G06F 9/50*       (2006.01)
   *G06F 11/30*      (2006.01)
   *H04L 43/0811*    (2022.01)
   *H04L 67/148*     (2022.01)
   *H04L 41/0893*    (2022.01)
   *H04L 67/63*      (2022.01)
   *H04L 67/5682*    (2022.01)

(56) References Cited

U.S. PATENT DOCUMENTS

| | | | | |
|---|---|---|---|---|
| 2014/0259109 A1* | 9/2014 | Houston | ................ | H04L 63/08 |
| | | | | 726/3 |
| 2015/0229522 A1* | 8/2015 | Poutievski | .......... | H04L 41/0813 |
| | | | | 709/221 |
| 2015/0245160 A1* | 8/2015 | Agrawal | ............... | H04L 41/145 |
| | | | | 455/406 |
| 2018/0067779 A1* | 3/2018 | Pillalamarri | .......... | H04L 41/046 |
| 2018/0115522 A1* | 4/2018 | Gleichauf | ............. | H04W 84/18 |
| 2019/0044888 A1* | 2/2019 | Narayanaswamy | .... | H04L 67/63 |
| 2019/0140939 A1* | 5/2019 | Schooler | ................ | H04L 67/52 |
| 2019/0141536 A1* | 5/2019 | Bachmutsky | ........... | H04L 67/10 |
| 2019/0156246 A1* | 5/2019 | Kuo | ....................... | G06N 20/00 |
| 2019/0158606 A1* | 5/2019 | Guim Bernat | .......... | H04W 4/40 |
| 2019/0227949 A1* | 7/2019 | Bernat | ................ | G06F 11/3476 |
| 2019/0320022 A1* | 10/2019 | Raghunath | .............. | G06F 3/067 |
| 2019/0369574 A1* | 12/2019 | Val | ............................. | G06F 8/65 |
| 2020/0076815 A1* | 3/2020 | Smith | ..................... | H04W 4/38 |
| 2020/0162199 A1* | 5/2020 | Li | ............................. | H04L 12/40 |
| 2020/0228602 A1* | 7/2020 | Spoczynski | ........... | H04L 67/56 |
| 2020/0272920 A1* | 8/2020 | Liu | ....................... | G06N 20/00 |
| 2020/0285523 A1* | 9/2020 | Guim Bernat | .......... | H04L 67/60 |
| 2020/0293942 A1* | 9/2020 | Barton | ................. | G06F 9/5005 |
| 2021/0067605 A1* | 3/2021 | Roth | .................... | H04L 41/5009 |
| 2021/0100070 A1* | 4/2021 | Sabella | .................... | H04L 63/08 |
| 2021/0144198 A1* | 5/2021 | Yu | ....................... | H04W 28/0967 |
| 2021/0281472 A1* | 9/2021 | Crowder | ................ | H04L 67/12 |
| 2022/0083325 A1* | 3/2022 | Yu | ............................. | G06F 8/65 |

* cited by examiner

FIG. 7

| Device | Container | CPU Usage (%) | Memory Usage (%) | OS | Docker Version | Network Accessibility | Update Score |
|---|---|---|---|---|---|---|---|
| FOG #1 | CONTAINER #1 | 10%, 2/8Core | 10%, 2G/4G | Ubuntu 16.04 | 19.03.5 | True | 80 |
| EDGE #1 | CONTAINER #1 | 20%, 4/4Core | 10%, 2G/4G | Ubuntu 16.04 | 19.03.5 | True | Origin |
| EDGE #2 | CONTAINER #1 | 10%, 4/4Core → 2/4Core | 10%, 4G/4G → 2/4G | Ubuntu 16.04 | 19.03.5 | True | 30 |
| EDGE #2 | CONTAINER #2 | NEW, 2/4Core | NEW, 2G/4G | Ubuntu 16.04 | 19.03.5 | True | 90 |
| EDGE #3 | CONTAINER #1 | 90%, 2/2Core | 70%, 2G/2G | Debian 7.0 | 17.06 | True | 15 |
| EDGE #4 | CONTAINER #1 | 10%, 2/8Core | 10%, 1G/4G | Debian 7.0 | 17.06 | False | 90 |

FIG. 8

| Device | Container | CPU Usage (%) | Memory Usage (%) | OS | Docker Version | Network Accessibility | Update Score |
|---|---|---|---|---|---|---|---|
| ~~FOG #1~~ | ~~CONTAINER #1~~ | ~~10%, 2/8Core → 70% (PREDICTION)~~ | ~~10%, 2G/4G → 80% (PREDICTION)~~ | ~~Ubuntu 16.04~~ | ~~19.03.5~~ | ~~True~~ | ~~80~~ 10 |
| EDGE #1 | CONTAINER #1 | 20%, 4/4Core | 10%, 2G/4G | Ubuntu 16.04 | 19.03.5 | True | Origin |
| EDGE #2 | CONTAINER #1 | 10%, 4/4Core → 2/4Core | 10%, 4G/4G → 2/4G | Ubuntu 16.04 | 19.03.5 | True | 30 |
| EDGE #2 | CONTAINER #2 | NEW, 2/4Core | NEW, 2G/4G | Ubuntu 16.04 | 19.03.5 | True | 90 |
| EDGE #3 | CONTAINER #1 | 90%, 2/2Core | 70%, 2G/2G | Debian 7.0 | 17.06 | True | 15 |
| ~~EDGE #4~~ | ~~CONTAINER #1~~ | ~~10%, 2/8Core~~ | ~~10%, 1G/4G~~ | ~~Debian 7.0~~ | ~~17.06~~ | ~~False~~ | ~~90~~ |

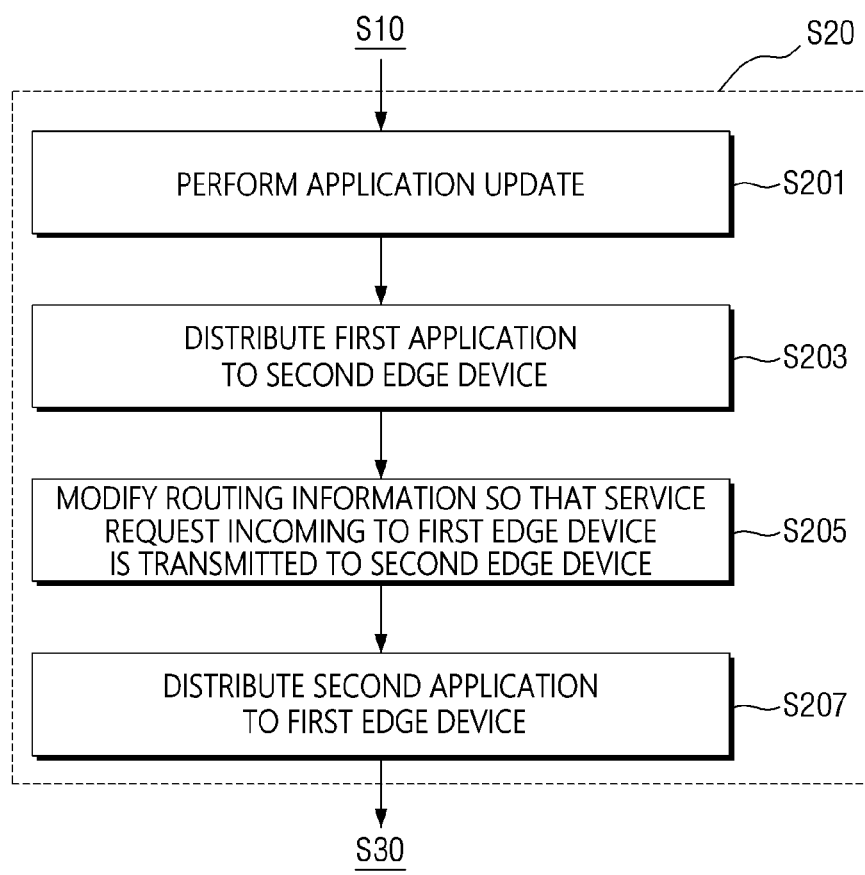

METHOD AND SYSTEM FOR DISTRIBUTING APPLICATION FOR EDGE COMPUTING DEVICES

CROSS-REFERENCE TO RELATED APPLICATIONS AND CLAIM OF PRIORITY

This patent application claims the benefit of Korean Patent Application No. 10-2020-0079847 filed on Jun. 30, 2020, which is hereby incorporated by reference in its entirety into this application.

BACKGROUND

1. Field

The present inventive concept relates to a method and system for distributing an application for an edge computing device. More specifically, it relates to a method and system for updating an application executed by a specific edge device of an edge computing network providing a service based on limited resources without service interruption.

2. Description of the Related Art

As the number of users of the cloud service increases exponentially, the amount of data and traffic that can be processed in servers and data centers has increased significantly. And, there is a problem due to the burden of communication and operation costs incurred in the process of transmitting and receiving data to the cloud, and the delay in the process of analyzing the data received by a server and transmitting the result.

In order to solve this problem, edge computing technology that performs and provides data processing and analysis at an edge device or gateway closest to the origin of data is in the spotlight. In general, edge computing has an advantage of reducing latency compared to cloud computing, and is therefore widely used for real-time services or mission-critical services.

However, a device typically used for edge computing has very limited computing resources compared to a cloud server, and it is often impossible to physically increase hardware computing resources such as personal devices, industrial facilities, vehicles, and ships. Further, even if it is possible to increase computing resources, it is located in a remote location and the additional cost required to increase computing resources is relatively high. Therefore, when a new sensor is added to an edge device or gateway, or when replacement and redistribution of an application is needed due to change in data processing or analysis method, it is difficult to seamlessly distribute a new application without interrupting the existing operating edge computing system.

Therefore, there is a need for a method and a system for updating an application executed by a specific edge device of an edge computing network without service interruption.

SUMMARY

The technical problem to be solved through some embodiments of the present inventive concept is to provide a method and system for updating an application of a specific edge device without interrupting the service of the edge computing network.

Another technical problem to be solved through some embodiments of the present inventive concept is to provide a method and system for determining another edge device to perform a service request while an application of a specific edge device of an edge computing network is being updated.

Another technical problem to be solved through some embodiments of the present inventive concept is to provide a method and system for adjusting resource allocation of another edge device in order to update an application of a specific edge device of an edge computing network.

Another technical problem to be solved through some embodiments of the present inventive concept is to provide a method and system for testing whether an application running in a specific edge device of an edge computing network operates normally after being updated.

Another technical problem to be solved through some embodiments of the present inventive concept is to provide a method and system for gradually applying application updates in consideration of resource usage states of edge devices of an edge computing network.

According to the present inventive concept, a method for distributing an application for an edge computing device performed by a computing device is provided. The method includes selecting a cluster including two or more edge devices from among a plurality of edge devices, distributing a first application to a second edge device included in the cluster, modifying routing information such that a service request incoming to a first edge device included in the cluster is transmitted to the second edge device, and replacing the first application running in the first edge device with a second application.

According to the present inventive concept, an edge computing system is provided. The edge computing system includes a plurality of edge devices including a managing device. The managing device among the plurality of edge devices may be configured to select a first edge device from among the plurality of edge devices, the first edge device executing a first application, the first application being a target of update, select a second edge device from among the plurality of edge devices, the second edge device being an edge device to distribute the first application, and instruct an application update. The first edge device among the plurality of edge devices may be configured to, in response to the application update instruction, modify routing information such that a service request previously incoming to the first edge device is transmitted to the second edge device, and distribute a second application. The second edge device among the plurality of edge devices may distribute the first application in response to the application update instruction.

According to the present inventive concept, a non-transitory computer readable recording medium storing a computer program is provided. The program may cause a computer to perform a method including selecting a cluster including two or more edge devices from among a plurality of edge devices, distributing a first application to a second edge device included in the cluster, modifying routing information such that a service request incoming to a first edge device included in the cluster is transmitted to the second edge device, and replacing the first application running in the first edge device with a second application.

BRIEF DESCRIPTION OF THE DRAWINGS

FIGS. 6 to 8 are diagrams for describing in more detail some steps of the application distribution method described with reference to FIG. 5.

FIG. 9 is a diagram for describing in more detail some steps of the application distribution method described with reference to FIG. 5.

DETAILED DESCRIPTION

Figure 1:
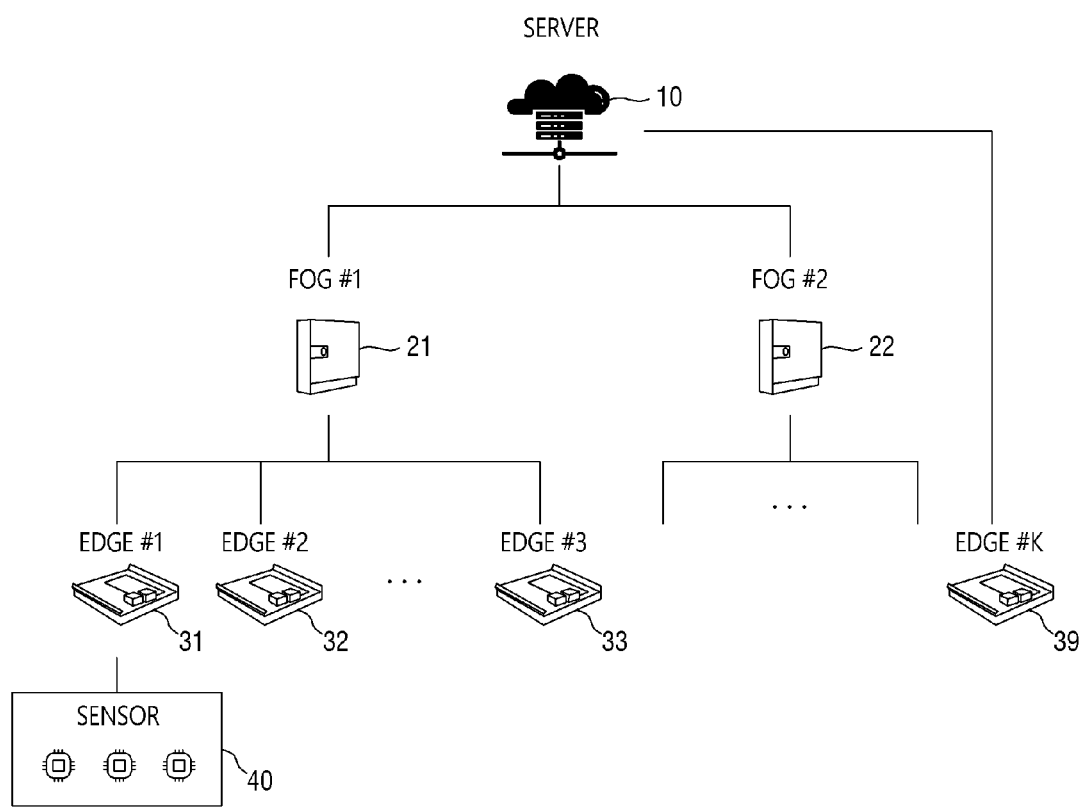
FIG. 1 is a diagram illustrating an edge computing system according to an embodiment of the present inventive concept.

Hereinafter, preferred embodiments of the present disclosure will be described with reference to the attached drawings. Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims.

In adding reference numerals to the components of each drawing, it should be noted that the same reference numerals are assigned to the same components as much as possible even though they are shown in different drawings. In addition, in describing the present invention, when it is determined that the detailed description of the related well-known configuration or function may obscure the gist of the present invention, the detailed description thereof will be omitted.

Unless otherwise defined, all terms used in the present specification (including technical and scientific terms) may be used in a sense that can be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the invention. In this specification, the singular also includes the plural unless specifically stated otherwise in the phrase.

In addition, in describing the component of this invention, terms, such as first, second, A, B, (a), (b), can be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

Hereinafter, some embodiments of the present invention will be described in detail with reference to the accompanying drawings.

FIG. 1 is a diagram illustrating an edge computing system according to an embodiment of the present inventive concept.

As shown in FIG. 1, the edge computing system includes a cloud server 10 and a plurality of edge devices 31 to 39. In one embodiment, the edge computing system may further include one or more fog devices 21 and 22, sensors 40, and user devices (not shown).

In an environment where an edge computing system provides services, at least some of the data collected by the sensor or the user device or service requests from the user device are processed by the sensor 40 or the edge devices 31 to 39 located close to the user device. In this environment, the data processing load of the cloud server 10 may be distributed to a plurality of edge devices 31 to 39 and fog devices 21 and 22. Further, the problem due to the network delay between the user device and the cloud server 10 is solved, and ultra-low delay communication and real-time service can be realized by the edge devices 31 to 39 located in a short distance from the sensor or the user devices. Furthermore, even when a failure of the cloud server 10 occurs, a seamless service can be provided to user devices by edge devices 31 to 39 and fog devices 21 and 22 that provide their own computing.

In some embodiments, the edge devices 31 to 39 may be connected to the cloud server 10 through a wide area network (WAN) and a mobile network, and the edge devices 31 to 39 may be connected to fog devices 21 and 22, sensors 40, user devices and/or other edge devices 31 to 39 each other through a local area network (LAN) and a wireless network.

In some embodiments, the edge devices 31 to 39 may process data collected from the sensor 40 or the user device and provide the result to the cloud server 10. Further, the edge devices 31 to 39 may process an application service request of the user device and provide the result to the user devices. The edge devices 31 to 39 may provide intermediate and final results of data processing as described above to other edge devices 31 to 39 or may transmit the application service request.

The plurality of edge devices 31 to 39 may be devices managed and controlled by the fog device 21, such as the edge devices 31, 32, and 33 of FIG. 1, or a device directly managed and controlled by a server without passing through a fog device, such as the edge device 39 of FIG. 1.

In some embodiments, the edge devices 31 to 39 may process different application requests from different types of sensors or user devices. In other words, the edge devices 31 to 39 may provide application services to different types of sensors 40 and user devices.

The plurality of fog devices 21 and 22 relays between the server 10 and the edge devices 31 to 39, and monitors and manages the edge devices 31 to 39. The plurality of fog devices 21 and 22 may function as a higher level device of edge devices connected to themselves.

The server 10 is a central server for data communication with the fog devices 21 and 22 and the edge devices 31 to 39, and may be a cloud server. The server 10 is equipped with a high-performance processor and hardware, and provides a result by processing tasks that are difficult for the fog devices 21 and 22 and the edge devices 31 to 39 to process.

Figure 2:
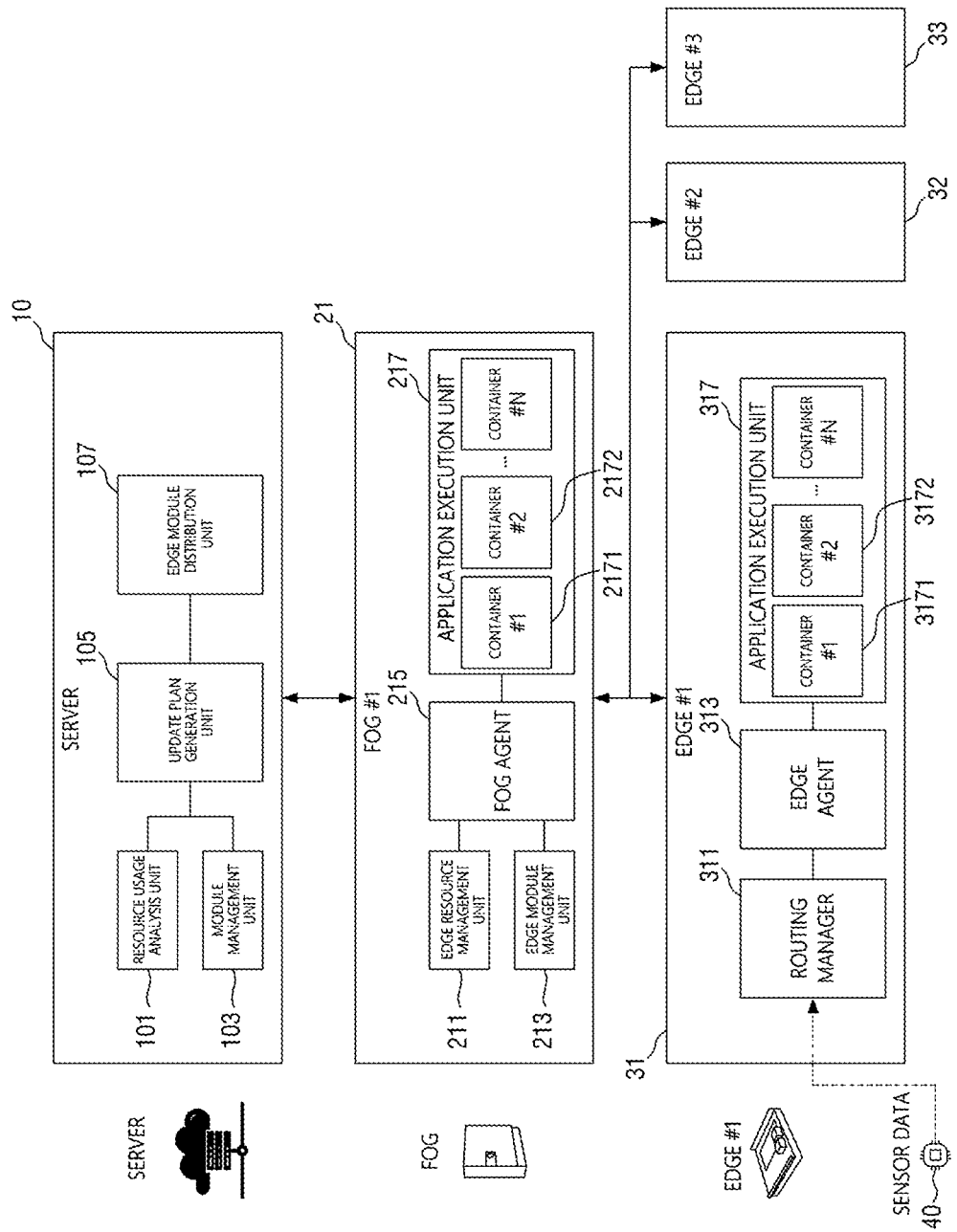
FIG. 2 is a block diagram of an edge computing system described with reference to FIG. 1.

Hereinafter, a configuration and operation of an edge computing system according to an embodiment of the present inventive concept will be described with reference to FIG. 2. However, only components related to the embodiment of the present inventive concept are shown in FIG. 2. Accordingly, those skilled in the technical field, to which the present inventive concept belongs, may recognize that other general purpose components may be further included in addition to the components illustrated in FIG. 2. Further, each of the components of the server 10, the fog device 21, and the edge device 31 shown in FIG. 2 represent functional elements that are functionally divided, and it should be noted that a plurality of components can be embodied in the form of integrating with each other in an actual physical environment.

The server 10, the fog device 21, and the edge devices 31 to 33 of the edge computing system shown in FIG. 2 may be a server device, a notebook computer, a desktop, a laptop, and the like. Further, the fog device 21 and the edge devices 31 to 33 include a network device such as a router, a switch, and an Integrated Access Device (IAD). Further, the fog device 21 and the edge devices 31 to 33 include various industrial devices, such as a computing device collecting and analyzing the state of factory facilities, and a device managing and integrating sensors that monitor weather conditions. In addition, the fog device 21 and the edge devices 31 to 33 include home devices such as a hub device and an AI speaker for providing an IoT service.

Hereinafter, for convenience of understanding, the edge device 31, the fog device 21, and the server 10 shown in FIG. 2 will be described in order.

Referring to FIG. 2, the edge device 31 includes a routing manager 311, an edge agent 313, and an application execution unit 317.

The routing manager 311 manages the routing of service requests incoming to the edge device 31. Specifically, the routing manager 311 may transmit a service request incoming to the edge device 31 to the other edge device 32 or to the fog device 21. The routing manager 311 may simultaneously transmit a service request incoming to the edge device 31 to one or more devices. The routing manager 311 may allow the edge device 31 to process the incoming service request on its own, and at the same time, may transmit it to the other edge device 31 for parallel processing.

The routing managers 311 of the edge devices 31 to 33 may directly or indirectly communicate with each other through the edge agent 313 or the fog device 21 to share or synchronize a routing policy.

The edge agent 313 manages and controls the overall operation of the edge device 31. Specifically, the edge agent 313 identifies an application running in the application execution unit 317 of the edge device 31, monitors the resource usage status of the edge device 31 and the like, and provides it to the fog device 21. Further, the edge agent 313 performs distribution of an application to be installed in the edge device 31 by exchanging messages between the fog device 21 and the edge agent 323 of the other edge device 32.

The application execution unit 317 executes an application in the edge device 31, analyzes and processes data collected from a sensor, or provides a service requested by a user device. The application execution unit 317 may simultaneously execute one or more applications. The application execution unit 317 installs, deletes, and distributes an application according to the command of the edge agent 313.

The application execution unit 317 may provide an independent execution environment to a plurality of applications through an isolation technology such as a Docker or a Linux container. Specifically, a plurality of applications may be simultaneously and independently executed on one operating system through respective containers 3172 and 3172. Further, applications executed in the edge device 31 may be distributed within the edge computing network in the form of image that can be executed by being contained in the containers 3172 and 3172.

The fog device 21 will be described again with reference to FIG. 2.

The fog device 21 includes an edge resource management unit 211, an edge module management unit 213, a fog agent 215, and an application execution unit 217.

The edge resource management unit 211 monitors and manages resource usage of edge devices 31 to 33 below the fog device 21. In some embodiments, the edge resource management unit 211 may monitor and manage resource usage for each container running in the lower edge devices 31 to 33. The edge resource management unit 211 collects the computing resource usage of the lower edge devices 31 to 33 in real time, and based on a service request amount (or data generation amount) predicted for each time zone, day of the week, and/or season, predicts the computing resource demands of the lower edge devices 31 to 33. Such real-time resource usage and resource usage prediction results are transmitted to the server 10, and may be used by the server 10 to select an edge device to participate in the application update or to determine the priority of the application update.

The edge module management unit 213 collects and manages information on an application (or module) running (or distributed) in the edge devices 31 to 33 below the fog device 21. Further, the edge module management unit 213 collects and manages the tree structure of the lower edge devices 31 to 33, the relationship between the fog device 21 and the edge devices 31 to 33, the configuration information (running environment (OS), required library, version, etc.) of the application distributed and running through each container of the edge devices 31 to 33 and application software stack information. This information collected and managed by the edge module management unit 213 is transmitted to the server 10, and may be used by the server 10 to select an edge device to participate in the application update or to determine the priority of the application update.

The fog agent 215 manages and controls the overall operation of the fog device 21. The fog agent 215 participates in the distribution of the application by exchanging messages between the server 10, the agent of the other fog device 22, and the edge agent of the lower edge devices 31, 32, 33.

In some embodiments, the fog device 21 may not only perform the function of managing the lower edge devices 31, 32, and 33, but also perform the function of the edge device. That is, the fog device 21 may execute an application through the application execution unit 217 to process a service request from a sensor and/or a user device. In this case, the fog agent 215 identifies an application running in the application execution unit 217 and monitors the resource usage status of the fog device 21 and provides it to the server 10. The application execution unit 217 installs, deletes, and distributes an application according to the command of the fog agent 215. Although not shown, the fog device 21 may further include a routing manager.

The server 10 will be described again with reference to FIG. 2.

The server 10 includes a resource usage analysis unit 101, a module management unit 103, an update plan generation unit 105, and an edge module distribution unit 107.

The resource usage analysis unit 101 obtains information on the resource usage of the fog and edge devices collected and managed by the edge resource management unit 211 of the fog device 21 from the fog agent 215 of the fog device 21. Alternatively, the resource usage analysis unit 101 may directly obtain information on the resource usage of each edge device from the edge agent 313 of each edge device.

The resource usage analysis unit 101 analyzes the resource usage for each container running in the fog device 21 and the edge devices 31 to 33, and provides information to identify an edge device that can provide the resources required by the application to be newly installed or a container within a specific edge device. The amount of available resources for each edge or container may be scored by the resource usage analysis unit 101 and provided to the update plan generation unit 105 or the like.

In some embodiments, the resource usage analysis unit 101 may analyze a trend of service request amount (or data generation amount) for each time zone, day of the week, and/or season for each container and a changing trend in resource usage accordingly, and generate prediction models for each container. In this case, the resource usage analysis unit 101 may provide prediction information on resource usage of the edge device or container according to the analysis result to the update plan generation unit 105 or the like.

In some embodiments, the resource usage analysis unit 101 identifies idle resources among the resources allocated to each edge device 31 to 33 or containers inside the edge device, and provide information to recover or adjust allocated resources to efficiently use the resource.

The module management unit 103 collects and manages the tree structure of the fog device 21, the edge devices 31 to 33, and containers of each edge device, the relationship between the fog device 21 and the edge devices 31 to 33, OS and CPU architecture information of edge devices, installed Docker version information, configuration information (required library, version, etc.) of applications distributed and running through each container of edge devices 31 to 33, and application software stack information. The module management unit 103 of the server 10 may obtain the information from the edge module management unit 213 of the fog device 21. The information may be provided to the update plan generation unit 105 and used to select an edge device to participate in the application update or to determine the priority of the application update.

The update plan generation unit 105 generates a plan for application distribution or update when there is a request to distribute or update a new application to the server 10 side. The update plan generation unit 105 selects one or more edge devices 31 to 33 to participate in the new application distribution based on the information provided by the resource usage analysis unit 101 and the module management unit 103, and if necessary, generates commands to adjust their resources. It will be described in more detail below.

The update plan generation unit 105 calculates a target score based on the resource demand of the container, in which the new application is to be operated, and SW stack information required to operate the application.

Further, the update plan generation unit 105 calculates a score for each fog device, an edge device, and/or each container in the edge device (hereinafter, collectively referred to as "edge device score"). The edge device score may be understood as indicating a degree of suitability for installation of a new application to be distributed. The edge device score is calculated based on the resource usage of each fog device, edge device, and/or container provided by the resource usage analysis unit 101, the tree structure between devices provided by the module management unit 103, OS, CPU architecture of the edge device, application configuration information, software stack information and the like. In some embodiments, in which prediction information on resource usage of an edge device or container is provided by the resource usage analysis unit 101, the edge device score may be updated by reflecting a prediction result on resource usage.

Further, the update plan generation unit 105 may generate a command to adjust the resources allocated to the edge devices 31 to 39 or their containers. The update plan generation unit 105, based on the information provided by the resource usage analysis unit 101, may identify idle resources among the resources allocated to each edge device 31 to 33 or containers inside the edge device. That is, it is possible to identify resources that have been allocated more than necessary and generate a command to recover or adjust them. The update plan generation unit 105 may update the edge device score by reflecting the result of resource adjustment.

Subsequently, the update plan generation unit 105 selects a virtual cluster to participate in distributing a new application in the dynamic switching blue-green method based on the target score for installation of a new application, and the edge device score calculated for each fog device, edge device, and container. Here, the virtual cluster means a cluster including, among a plurality of edge devices, a first edge device to install and test a new application and a second edge device to temporarily install and execute an application currently running in the first edge device. The second edge device may be understood as a device that plays the role of executing an application running in the first edge device instead until it is confirmed whether a new application is normally executed in the first edge device.

The update plan generation unit 105 selects a first edge device from among edge devices having an edge device score that exceeds a target score for installing a new application. Further, the update plan generation unit 105 selects a second edge device from among edge devices having an edge device score that exceeds a target score for installing an application currently running in the first edge device. Further, the update plan generation unit 105 selects a second edge device from among edge devices, to which a service request processed by an application currently running in the first edge device can be transmitted from the first edge device through a network. In other words, the first edge device and the second edge device should be selected from among edge devices capable of communicating with each other.

When the selection of a virtual cluster to participate in the new application distribution is completed, the update plan generation unit 105 generates an update plan including a result of selecting a virtual cluster and a resource adjustment command, and provides it to the edge module distribution unit 107.

The edge module distribution unit 107 transmits the update plan provided by the update plan generation unit 105 to the first edge device 31 and the second edge device 32 through the fog device 21 to instruct the application update.

Figure 3:
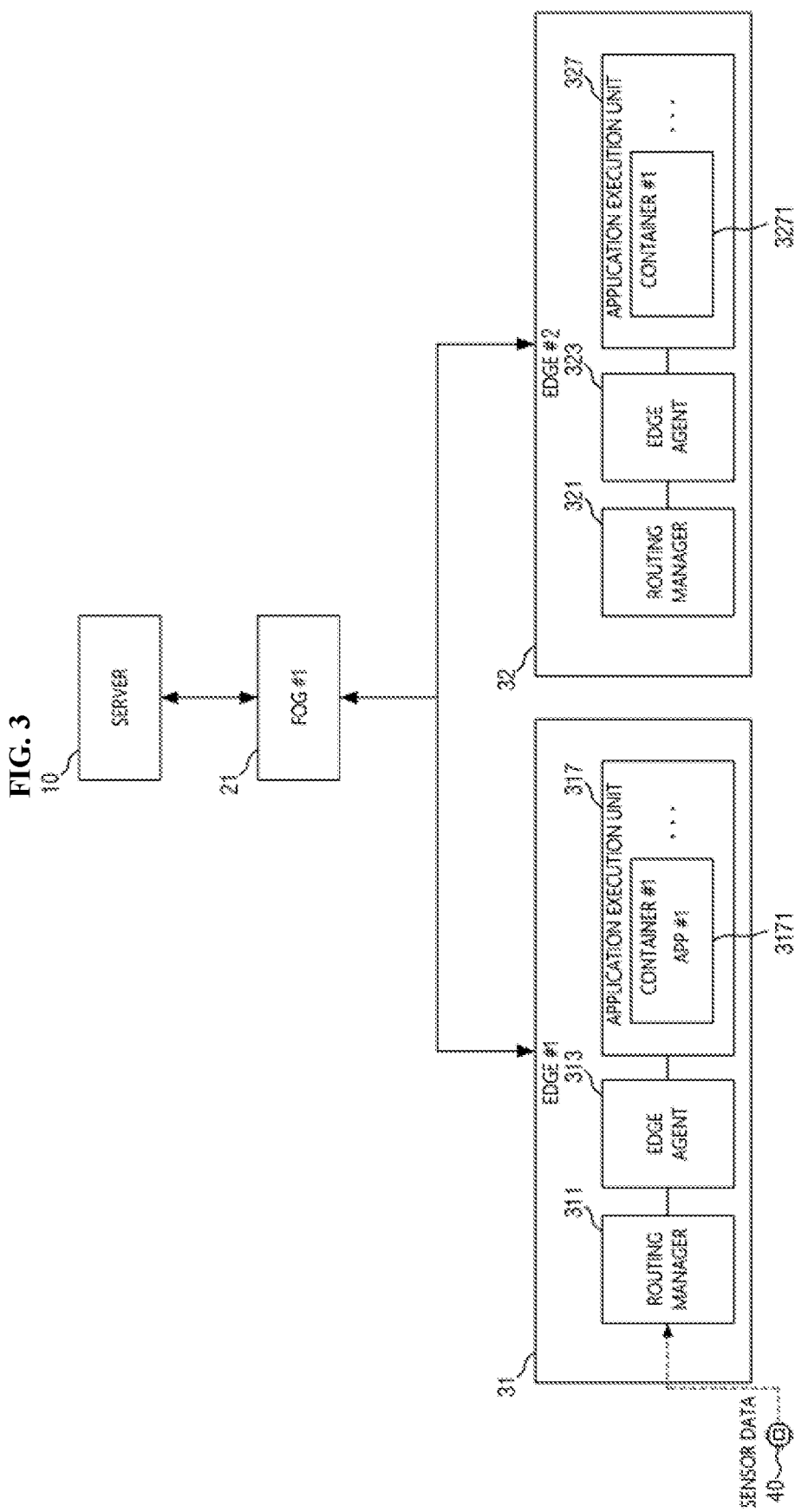
FIGS. 3 and 4 are diagrams for describing a process of updating an application of an edge device in the edge computing system described with reference to FIG. 2.
Figure 4:
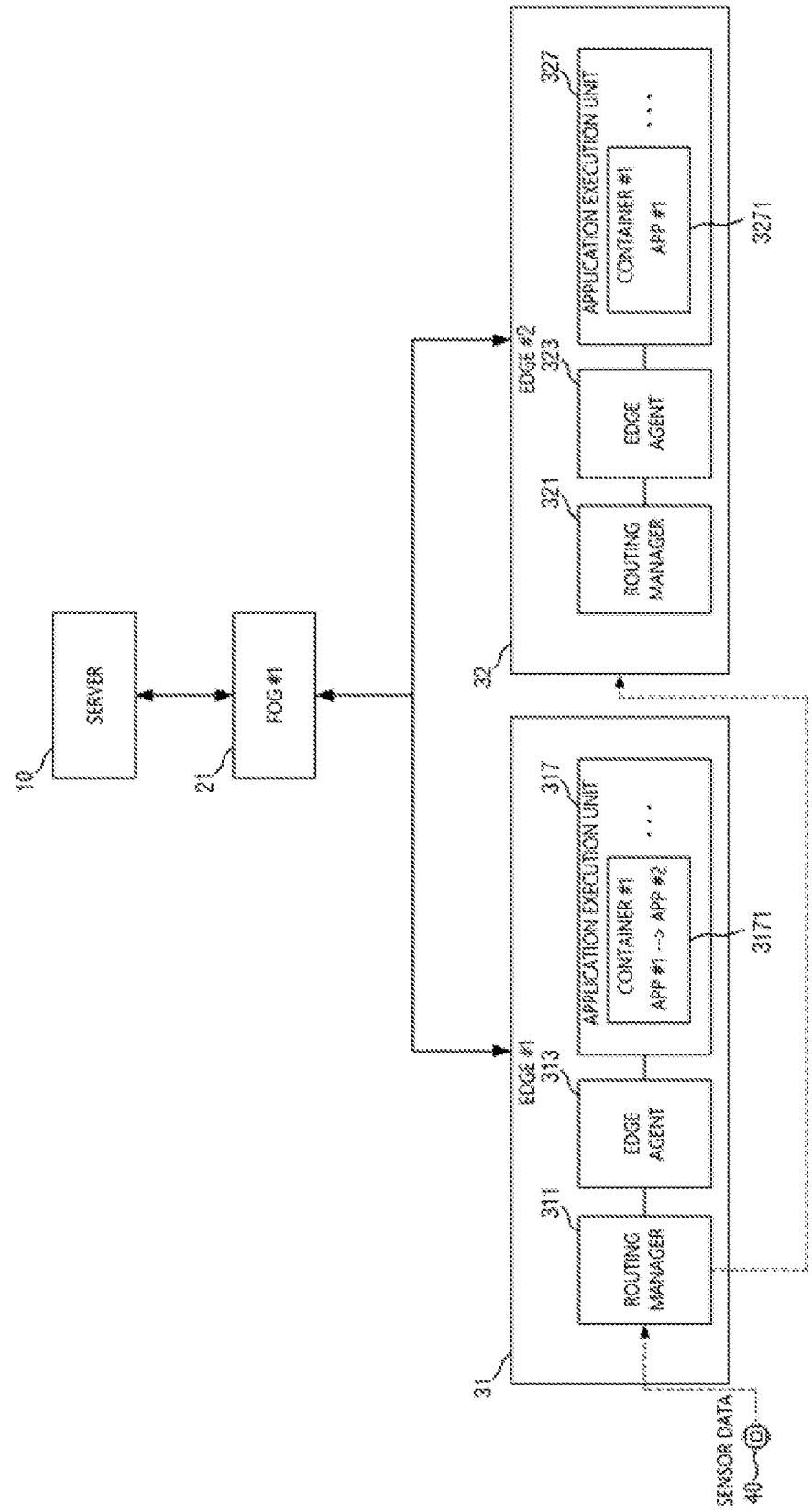

So far, the configuration and operation of the edge computing system according to the present embodiment have been described with reference to FIG. 2. Hereinafter, with reference to FIGS. 3 and 4, the process of distributing a new application (hereinafter referred to as the "second application") to an edge device in the edge computing system according to an update instruction of the edge module distribution unit 107 of the server 10 will be described. For convenience of explanation, the edge device 31 shown in FIGS. 3 and 4 represents a first edge device, in which a second application is to be installed, and the edge device 32 represents a second edge device, in which an application currently running in the edge device 31 (hereinafter referred to as the "first application") is to be temporarily installed and executed. As described above, the second edge device 32 can be understood as a device that plays the role of executing instead the first application running in the first edge device until it is confirmed whether the second application is normally executed in the first edge device 31.

In the following description, the second application is the first application updated. That is, a case of reflecting the second application that is the version-up of the first application normally operating to the edge computing system, and replacing the first application with the second application when it is confirmed that the second application operates normally will be described.

FIG. 3 is an exemplary diagram showing a state before an application update process starts. The first application (APP #1) is running in the container 3171 of the first edge device 31 of FIG. 3. There is no currently running application in the container 3271 of the second edge device 32 of FIG. 3.

The update instruction of the edge module distribution unit 107 of the server 10 may be transmitted to the edge agents 313 and 323 of each of the first edge device 31 and the second edge device 32 through the fog device 21.

FIG. 4 is an exemplary diagram for describing a process, in which an application update proceeds. Referring to FIG. 4, the edge agent 323 of the second edge device 32 receiving the application update instruction installs the first application in the container 3271 of the application execution unit 327. The first application may be provided from the first edge device 31, the fog device 21, or the server 10 to the second edge device 32. The first application may be provided in the form of, for example, Docker image, and may be installed and executed in the container 3271 of the second edge device 32.

Meanwhile, when an application update instruction is received, the edge agent 313 of the first edge device 31 modifies the routing information referenced by the routing manager 311. Specifically, routing information is modified so that a service request incoming to the first application of the first edge device 31 is transmitted to the second edge device 32. As a result, service requests incoming to the first application of the first edge device 31 are now transmitted to the second edge device 32 and processed by the second edge device, and thus no service interruption occurs even while the application of that the first edge device 31 is being updated in the below process.

Then, the edge agent 313 of the first edge device 31 installs the second application in the container 3171 of the application execution unit 317. In this case, the second application may be provided in the form of image or the like from the fog device 21 or the server 10. The edge agent 313 installs and executes the second application in the container 371, in which the first application is installed and running, so that the application executed in the container 371 of the first edge device 31 is dynamically switched from the first application to the second application (APP #1→APP #2).

Subsequently, the edge agent 313 of the first edge device 31 modifies routing information so that the service request incoming to the first application of the second edge device 31 is also transmitted to the second application of the first edge device 31. Now, service requests that were transmitted to the first application of the second edge device 32 are also transmitted to the second application of the first edge device 31.

If the test result of the second application newly installed in the first edge device 31 is normal, it indicates that the second application is now ready to replace the first application. In this case, the routing information is modified again so that the service request is no longer transmitted to the first application of the second edge device 32, and the first application running in the container 3271 of the second edge device 32 can be deleted.

If there is an abnormality in the test result of the second application newly installed in the first edge device 31, it indicates that the application of the service of the second application should be suspended. In this case, the second application running in the container 3171 of the first edge device 31 is rolled back to the first application, and routing information is modified so that the service request is no longer transmitted to the first application of the second edge device 32, and the first application executed in the container 3271 of the second edge device 32 may be deleted.

So far, the structure, function, and operation of an edge computing system according to an embodiment of the present inventive concept have been described with reference to FIGS. 1 to 4. In the edge computing system according to the present embodiment, the application update can be distributed without interrupting the service of the edge computing system by allowing another edge device to temporarily execute the previous version of the application instead during the update distribution of the application.

Hereinafter, a method of distributing an application for an edge computing device according to another embodiment of the present inventive concept will be described with reference to FIGS. 5 to 10.

Figure 5:
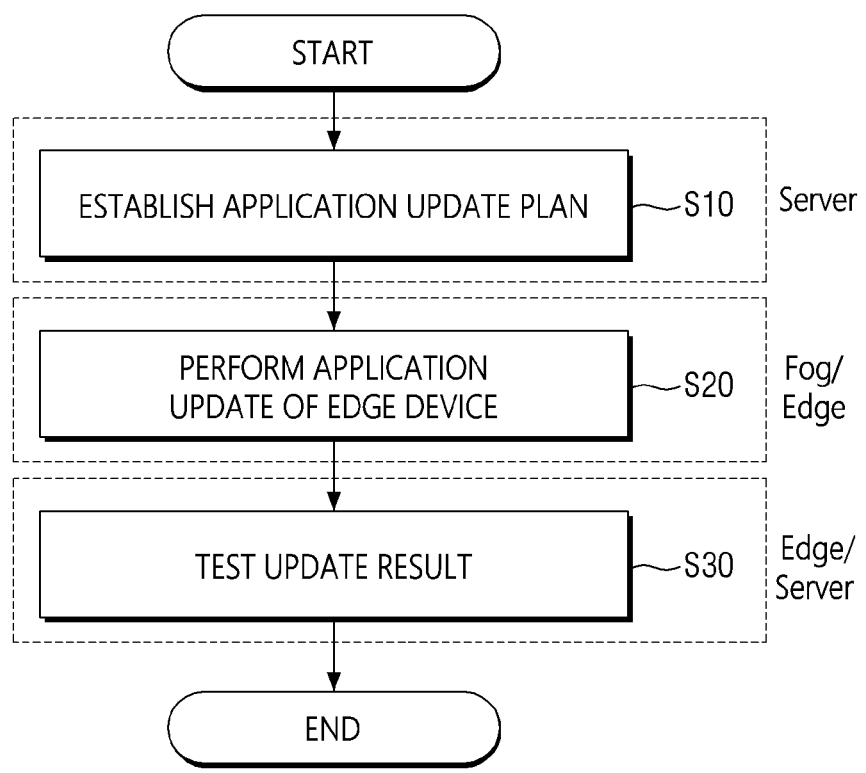
FIG. 5 is a flowchart of an application distribution method for an edge computing device according to another embodiment of the present inventive concept.

FIG. 5 is an exemplary flowchart showing a series of processes for distributing an application to an edge computing device according to the present embodiment. However, this is only a preferred embodiment for achieving the object of the present inventive concept, and of course, some steps may be added or deleted as necessary.

Each step of the application distribution method illustrated in FIG. 5 may be performed, for example, by the edge computing system described with reference to FIGS. 1 to 4. In other words, each step of the application distribution method may be implemented with one or more instructions executed by the processor of the computing device such as the server 10, fog devices 21 and 22, and edge devices 31 to 39. First steps included in the application distribution method may be performed by a first computing device, and second steps of the method may be performed by a second computing device. Hereinafter, description will be continued assuming that each step of the application distribution method is performed by some of the server 10, fog devices 21 and 22, and edge devices 31 to 39 of the edge computing system. However, the subject of performing each step is merely an example, and the present inventive concept is not limited by the following description, and for convenience of explanation, the description of the subject of operation of some steps included in the application distribution method may be omitted.

Even if not mentioned separately, in each operation of the application distribution method according to the present embodiment, the technical idea of the embodiments described with reference to FIGS. 1 to 4 may be reflected. Further, on the contrary, the technical idea reflected in each operation of the application distribution method according to the present embodiment may also be reflected in the configuration and operation of the edge computing system described with reference to FIGS. 1 to 4.

In the following description, an example of updating a first application installed and running in an edge device to a second application will be described. That is, a case of reflecting a second application, which is the version-up of the first application operating normally, to the edge device, and when it is confirmed that the second application operates normally, replacing the first application with the second application will be described.

As shown in FIG. 5, the method of distributing an application for an edge device according to the present embodiment may include establishing an application update plan (S10), updating a first application of the edge device to a second application (S20), and testing the update result (S30).

Step S10 may be performed, for example, by the server 10, step S20 may be performed by fog devices 21, 22 and/or edge devices 31 to 39, and step S30 may be performed by cooperation of the server 10, the fogs 21 and 22, and the edge devices 31 to 39.

Figure 6:
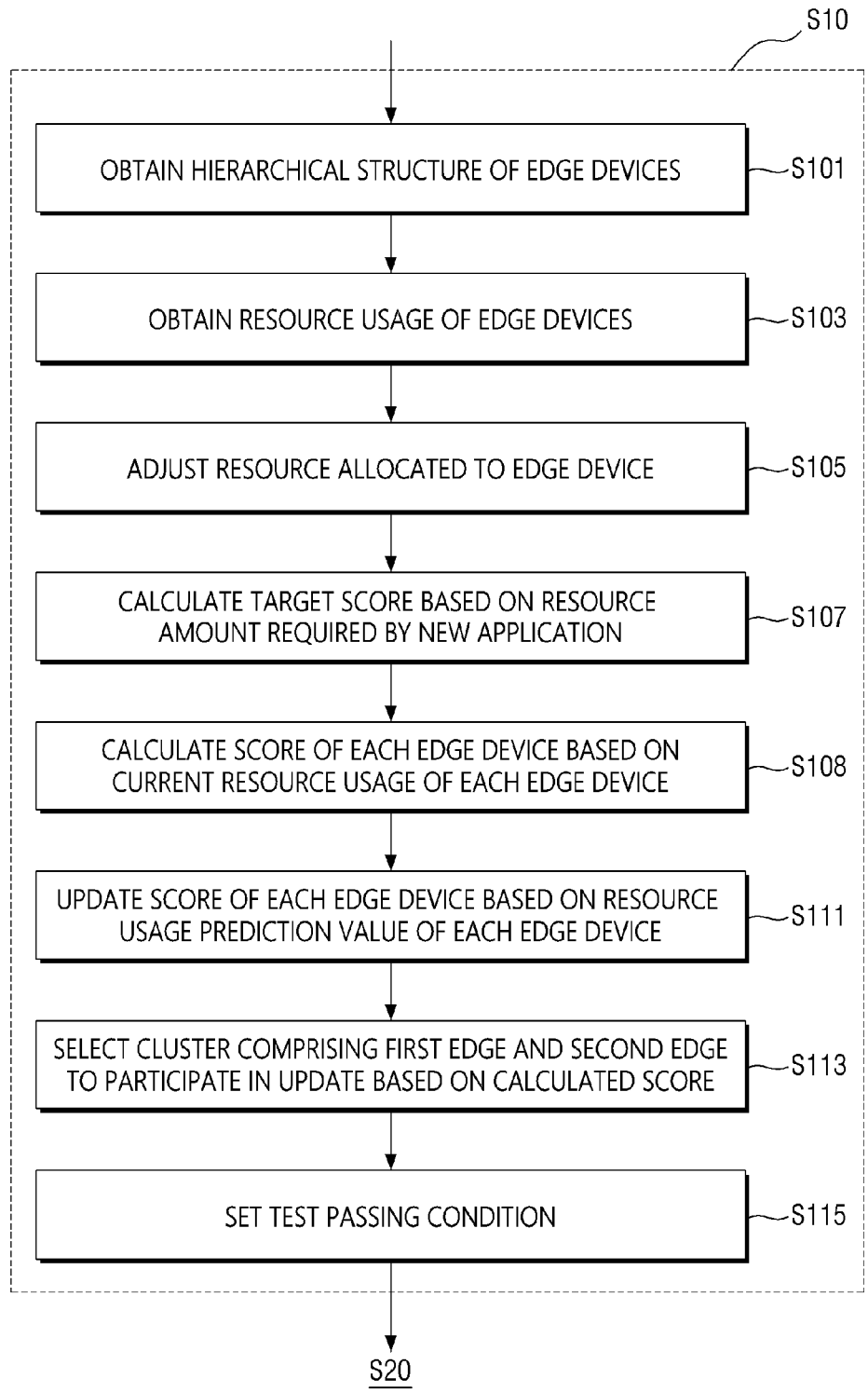

FIG. 6 is a diagram for describing in more detail step S10 of FIG. 5.

Referring to FIG. 6, first, in step S101, the tree structure (hierarchical structure) of edge devices is obtained by, for example, the module management unit 103 of the server 10, and in step S103, the resource usage of the edge devices is obtained by the resource usage analysis unit 101.

If, based on the resource usage obtained in step S103, it is determined that there is an idle resource among the resources allocated to the edge devices or containers inside the edge devices, the excessively allocated resource may be recovered or adjusted in step S105. This will be described with reference to FIG. 7.

FIG. 7 is a table showing an exemplary case, in which the resource usage rate of FOG #1, EDGE #1, EDGE #2, EDGE #3, and EDGE #4, an operating system, Docker version, network connectivity, and edge scores to be described later are calculated. FIG. 7 shows a case, in which the resource adjustment of EDGE #2 has occurred. In the case of EDGE #2, all CPU resources (4 Core) and all memory resources (4 GB) were originally allocated to one container (container #1), and as a result, both CPU usage rate and memory usage rate were only 10%. That is, more resources were allocated than resources that one container of EDGE #2 needs. In step S105, some of the resources (CPU 2. Core, 2 GB of memory) allocated to container #1 of EDGE #2 may be recovered and allocated to container #2. As a result, both CPU 2. Core and 2 GB of memory are allocated to container #1 and container #2 of EDGE #2.

It will be described again with reference to FIG. 6.

In step S107, a target score is calculated based on the resources required for execution of the new application, that is, the second application. In the calculation of the target score, a resource demand amount of a container, in which the second application is to be operated, and SW stack information required to operate the second application may be reflected.

In step S109, a score of each edge device is calculated based on the current resource usage for each container of each edge device. The edge device score may be calculated based on the resource usage of a container of each edge device, the tree structure between edge devices, the OS and CPU architecture of the edge device, application configuration information, software stack information and the like, and it can be understood as indicating that how suitable a container of each edge device is for the installation of the second application.

Referring back to FIG. 7, in FIG. 7, the edge device score calculated based on the resource usage rate of FOG #1, EDGE #1, EDGE #2, EDGE #3, and EDGE #4, an operating system, Docker version, network connectivity, and the like is described in the Update Score column.

In step S111, if there is a prediction model generated based on service request amount (or data generation amount) predicted by each time zone, day of the week, and/or season according to the container of the edge device, the edge device score can be updated by reflecting future prediction information. This will be described with reference to FIGS. 7 and 8.

Referring to FIG. 7, the CPU usage rate and memory usage rate of FOG #1 are only 10%, so there is sufficient resource, and the score of FOG #1 calculated based on such a state is as shown in FIG. 7 is 80. However, if FOG #1's future CPU usage rate predicted by the prediction model is 70% and memory usage rate is 80%, unlike the current resource state, there will be no room for resources in the future. In this case, the resource usage rate of FOG #1 and the corresponding score may be updated as shown in FIG. 8.

In step S113, based on the score calculated in step S111 and updated in step S113, a virtual cluster including a first edge device and a second edge device to participate in the application update is selected. In the example shown in FIG. 8 EDGE #1 is the first edge device executing the first application. The first edge device is one of devices capable of providing a software stack and a resource amount required by the second application. EDGE #2 was selected as the second edge device that plays the role of executing the first application instead until it is confirmed whether the new second application is normally executed in the first edge device. EDGE #2 is one of the devices capable of providing a resource amount and software stack required by the first application. Referring to FIG. 8, the scores of container #2 of EDGE #2 and container #1 of EDGE #4 are the same as 90 points, but in case of EDGE #4, the network connectivity with EDGE #1, which is the first edge device, is insufficient, and thus, it can be seen that it was excluded from the selection of the second edge device. In other words, since the service request incoming to EDGE #1, which is the first edge device, cannot be transmitted to EDGE #4, EDGE #4 cannot become a second edge device that executes the application running in the first edge device instead.

Finally, in step S115, a condition to test the normal operation of the second application is set. This will be described later with reference to FIG. 10.

So far, the process of establishing an application update plan by the server 10 or the like has been described with reference to FIGS. 6 to 8. In particular, the process of selecting a cluster including the first edge device and the second edge device to participate in the update based on the score calculated in consideration of the resource demand of the second application to be newly updated and the resource status of each edge device is described (S10). Hereinafter, referring to FIG. 9, step S20 of performing an application update for the first edge device and the second edge device will be described in more detail.

Referring to FIG. 9, in step S201, an instruction to update a first application to a second application is received for a cluster including a first edge device and a second edge device. The update instruction may be transmitted from the server 10 through the fog devices 21 and 22 to the first edge device 31 and the second edge device 32 participating in the update. During this process, the fog agent 215 and the edge agents 313 and 323 may transmit an update instruction.

In step S203, the first application is distributed to the second edge device 32. Specifically, the edge agent 323 of the second edge device 32 receiving the application update instruction installs the first application in the container 327 of the application execution unit 327. The first application may be provided from the first edge device 31, the fog device 21, or the server 10 to the second edge device 32. The first application may be provided in the form of, for example, Docker image, and may be installed and executed in the container 3271 of the second edge device 32.

In step S205, routing information is modified. Specifically, the edge agent 313 of the first edge device 31 receiving the application update instruction modifies routing information so that the service request incoming to the first application of the first edge device 31 is transmitted to the second edge device 32. As a result, service requests that were incoming to the first application of the first edge device 31 are now transmitted to the second edge device 32 and processed by the second edge device, and thus no service interruption occurs even while the application of the first edge device 31 is being updated and tested.

In step S207, the second application is distributed to the first edge device 31. Specifically, the edge agent 313 of the first edge device 31 installs the second application in the container 3171 of the application execution unit 317 instead of the first application. In this case, the second application may be provided in the form of image or the like from the fog device 21 or the server 10. The edge agent 313 installs and executes the second application in the container 371, in which the first application is installed and running, so that the application executed in the container 371 of the first edge device 31 is dynamically switched from the first application to the second application.

So far, with reference to FIG. 9, the process of performing an application update for the first edge device and the second edge device has been described (S20). Application updates can be distributed without service interruption of the edge computing system by distributing the second application to the first edge device after allowing the second edge device to execute instead the first application running in the first edge device by the method described above. Hereinafter, with reference to FIG. 10, step S30 of testing the application update result will be described in more detail.

Figure 10:
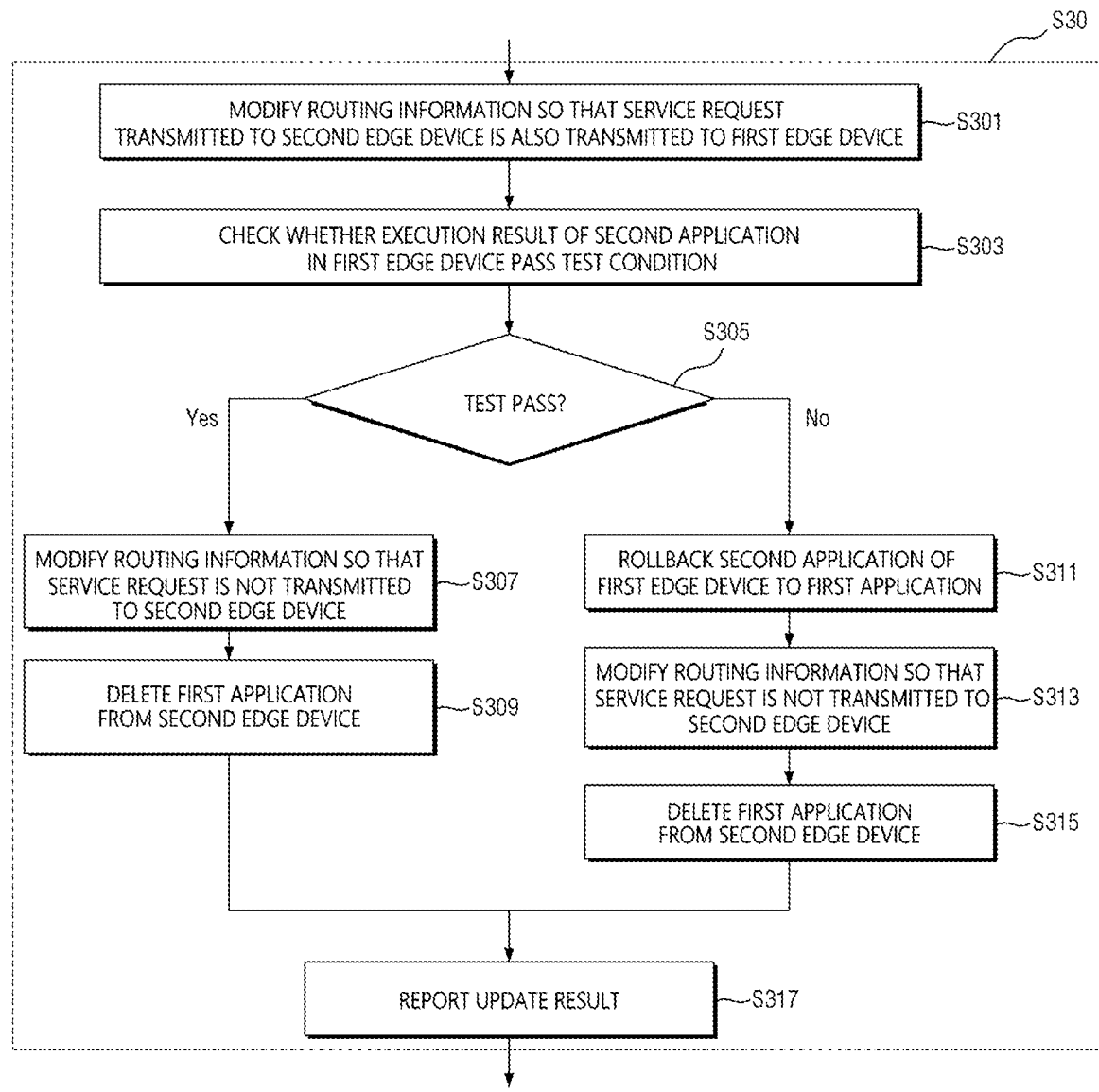
FIG. 10 is a diagram for describing in more detail some steps of the application distribution method described with reference to FIG. 5.

Referring to FIG. 10, in step S301, the edge agent 313 of the first edge device 31 modifies the routing information so that a service request incoming to the first application of the second edge device 31 is also transmitted to the second application of the first edge device 31. Accordingly, service requests that were transmitted to the first application of the second edge device 32 are also transmitted to the second application of the first edge device 31.

In step 303, it is checked whether the execution result of the second application in the first edge device passes the test condition. The test condition may be set by the update plan generation unit 105 of the server 10 in step S115 of the update plan generation (S10) process described with reference to FIG. 6.

The test condition includes, for example, whether the execution result of the second application in the first edge device coincides with the execution result of the first application in the first edge device in the past. Here, the execution result of the first application in the first edge device in the past may be a record or log of a result of executing the first application in the first edge device before the second application is distributed to the first edge device. That is, whether the second application distributed to the first edge device produces the same result as the first application executed in the first edge device in the past may be set as the test condition.

The test condition includes, for example, whether the execution result of the second application in the first edge device coincides with the execution result of the first application distributed to the second edge device. That is, whether the second application distributed to the first edge device produces the same result as the first application currently being temporarily executed in the second edge device may be set as the test condition.

The test condition may further include a throughput, a processing speed, and a resource usage rate of the second application in the first edge device, and the present inventive concept is not limited to the test conditions described above.

If the test passes, the process proceeds from step S305 to step S307, and if the test does not pass, the process proceeds from step S305 to step S311.

If the second application passes the test in step S305, it may indicate that the second application is now ready to completely replace the first application. In step S307, the routing information is modified so that the service request is no longer transmitted to the second edge device. Further, since the first application temporarily installed in the second edge device is now unnecessary, the first application running in the second edge device is stopped in step S309, and resources allocated for execution of the first application are released. Also, the first application may be deleted from the second edge device.

If it is determined in step S305 that the second application has not passed the test, the update to the second application should be suspended. In this case, the second application running in the first edge device 31 is rolled back to the first application (S311), and routing information is modified so that the service request is no longer transmitted to the first application of the second edge device 32 (S313), and the first application may be deleted from the second edge device 32 (S315).

In step S317, the update result is reported to the fog devices 21 and 22 and/or the server 10. Specifically, the update result here includes whether the second application has passed the test and completely replaced the first application in the first edge device, or whether the second application did not pass the test and the first edge device is rolled back to the first application.

So far, the method of distributing an application to an edge computing device according to the present embodiment has been described with reference to FIGS. 6 to 10. According to the present embodiment, while updating (distributing) the first application running in the first edge device to the second application, it is possible to distribute application updates without interrupting the service provided by the application by allowing the second edge device, which is distinct from the first edge device, to temporarily execute instead the first application.

So far, with reference to FIGS. 1 to 10, an application distribution method for an edge computing system and an edge computing device according to some embodiments of the present inventive concept, and an application field thereof have been described. Hereinafter, an exemplary computing device 1500 capable of implementing the server 10, the fog devices 21 and 22, and the edge devices 31 to 39 according to some embodiments of the present inventive concept will be described.

Figure 11:
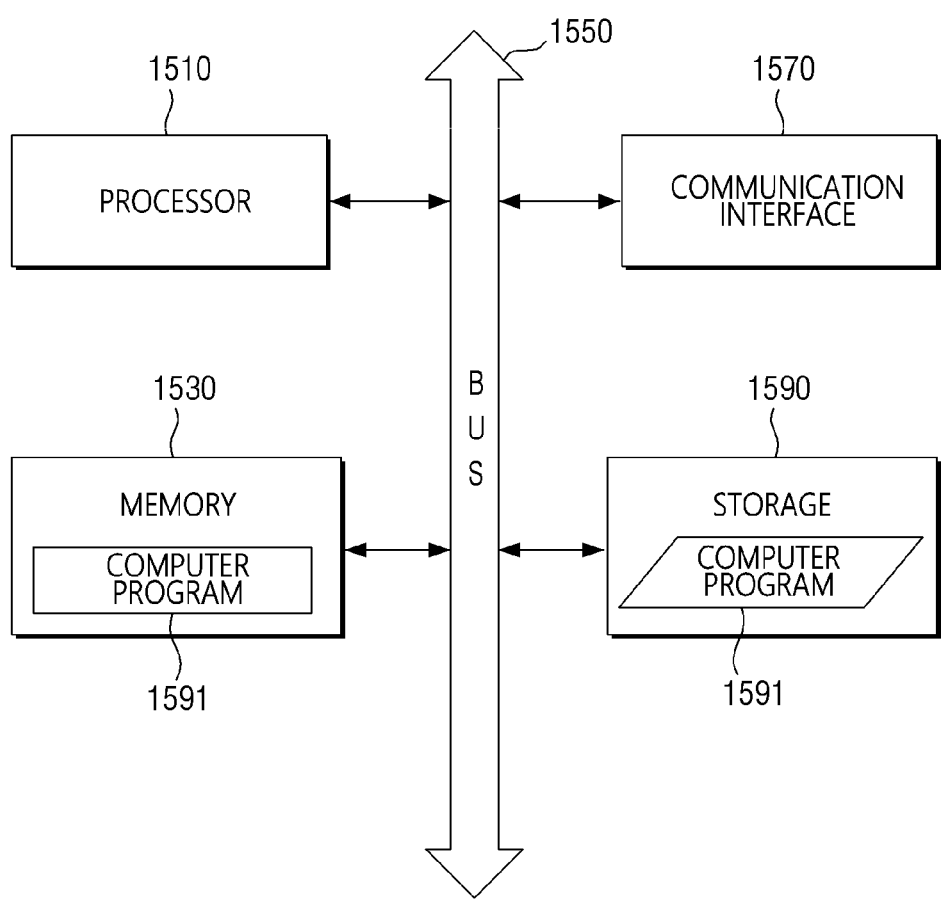
FIG. 11 is a diagram for describing an exemplary computing device capable of implementing a server, a fog device, or an edge device according to some embodiments of the present inventive concept.

FIG. 11 is a hardware configuration diagram illustrating an exemplary computing device 1500 capable of implementing the server 10, the fog devices 21 and 22, and the edge devices 31 to 39 according to some embodiments of the present inventive concept.

As shown in FIG. 11, the computing device 500 may include one or more processors 510, a bus 550, a communication interface 570, a memory 530, which loads a computer program 591 executed by the processors 510, and a storage 590 for storing the computer program 591. However, FIG. 11 illustrates only the components related to the embodiment of the present disclosure. Therefore, it will be appreciated by those skilled in the art that the present disclosure may further include other general purpose components in addition to the components shown in FIG. 11.

The processor 510 controls overall operations of each component of the computing device 500. The processor 510 may be configured to include at least one of a Central Processing Unit (CPU), a Micro Processor Unit (MPU), a Micro Controller Unit (MCU), a Graphics Processing Unit (GPU), or any type of processor well known in the art. Further, the processor 510 may perform calculations on at least one application or program for executing a method/operation according to various embodiments of the present disclosure. The computing device 500 may have one or more processors.

The memory 530 stores various data, instructions and/or information. The memory 530 may load one or more programs 591 from the storage 590 to execute methods/operations according to various embodiments of the present disclosure. An example of the memory 530 may be a RAM, but is not limited thereto.

The bus 550 provides communication between components of the computing device 500. The bus 550 may be implemented as various types of bus such as an address bus, a data bus and a control bus.

The communication interface 570 supports wired and wireless internet communication of the computing device 500. The communication interface 570 may support various communication methods other than internet communication. To this end, the communication interface 570 may be configured to include a communication module well known in the art of the present disclosure.

The storage 590 can non-temporarily store one or more computer programs 591. The storage 590 may be configured to include a non-volatile memory, such as a Read Only Memory (ROM), an Erasable Programmable ROM (EPROM), an Electrically Erasable Programmable ROM (EEPROM), a flash memory, a hard disk, a removable disk, or any type of computer readable recording medium well known in the art.

The computer program 591 may include one or more instructions, on which the methods/operations according to various embodiments of the present disclosure are implemented. When the computer program 591 is loaded on the memory 530, the processor 510 may perform the methods/operations in accordance with various embodiments of the present disclosure by executing the one or more instructions.

In the above case, the server 10, the fog devices 21 and 22, and the edge devices 31 to 39 according to some embodiments of the present inventive concept may be implemented through the computing device 1500.

So far, various embodiments of the present inventive concept and effects according to the embodiments have been mentioned with reference to FIGS. 1 to 11. Effects according to the technical idea of the present inventive concept are not limited to the above mentioned effects, and other effects not mentioned will be clearly understood by those skilled in the art from the following description.

The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

In the above description, it is described that all the components constituting the embodiments of the present disclosure are combined or operated as one, but the technical features of the present disclosure are not limited to these embodiments. That is, within the scope of the present disclosure, all of the components may be selectively combined and operated in one or more combinations.

Although the operations are shown in a specific order in the drawings, those skilled in the art will appreciate that many variations and modifications can be made to the preferred embodiments without substantially departing from the principles of the present invention. Therefore, the disclosed preferred embodiments of the invention are used in a generic and descriptive sense only and not for purposes of limitation. The scope of protection of the present invention should be interpreted by the following claims, and all technical ideas within the scope equivalent thereto should be construed as being included in the scope of the technical idea defined by the present disclosure.

What is claimed is:

1. A method for distributing an application for an edge computing device performed by a computing device, the method comprising:
    selecting a cluster including two or more edge devices and fog devices from among a plurality of edge devices and fog devices, the two or more edge devices and the fog devices comprising a first edge device on which a first application is running and first fog device on which no application is running;
    distributing the first application to the first fog device;
    modifying routing information such that a service request for the first application incoming to the first edge device is transmitted to the first fog device; and
    replacing the first application running in the first edge device with a second application which is an updated first application, while the first application is running in the first fog device;
    wherein, the selecting of the cluster comprises determining network connectivity between the first edge device and the first fog device and excluding the first fog device from the cluster, if the result of the determining indicates that the network connectivity between the first edge device and the first fog device is below a threshold number.

2. The method of claim 1, further comprising:
    after replacing the first application running in the first edge device with a second application, modifying the routing information such that the service request transmitted to the first fog device is also transmitted to the first edge device; and
    testing the second application distributed to the first edge device.

3. The method of claim 2, wherein testing the second application comprises comparing a result of execution by the second application in the first edge device with a result of execution by the first application in the first edge device.

4. The method of claim 2, wherein testing the second application comprises determining if a result of execution by the second application in the first edge device is the same as a result of execution by the first application in the first fog device.

5. The method of claim 4, wherein testing the second application comprises:
if the result of execution by the second application in the first edge device is the same as with the result of execution by the first application in the first fog device, restoring the routing information such that the service request transmitted to the first fog device is transmitted to the first edge device.

6. The method of claim 4, wherein testing the second application comprises:
if the result of execution by the second application in the first edge device is the same as with the result of execution by the first application in the first fog device, rolling back the first edge device to execute the first application.

7. The method of claim 1, wherein selecting the cluster comprises:
obtaining resource usage of at least some devices of the plurality of edge devices and fog devices; and
determining the first edge device and the first fog device based on the resource usage.

8. The method of claim 7, wherein the first edge device is an edge device capable of providing a resource amount required by the second application among the plurality of edge devices and fog devices; and
the first fog device is a device capable of providing a resource amount required by the first application among the plurality of edge devices and fog devices.

9. The method of claim 7, wherein selecting the cluster further comprises:
adjusting a resource allocated to any one of the at least some devices.

10. The method of claim 7, wherein selecting the cluster further comprises: predicting resource usage of the at least some devices of the plurality of edge devices and fog devices; and
determining the first edge device and the first fog device based on the resource usage prediction result.

11. The method of claim 7, wherein selecting the cluster further comprises:
obtaining information on a software stack required by the first application and the second application; and
obtaining information on a software stack that can be provided by the at least some devices of the plurality of edge devices and fog devices.

12. The method of claim 1, wherein selecting the cluster comprises:
obtaining resource usage for each container running in at least some devices of the plurality of edge devices and fog devices; and
determining, as the first fog device, a device executing a container capable of providing amount of resource required by the first application,
wherein distributing the first application to the first fog device comprises distributing the first application to the container of the first fog device.

13. The method of claim 12, wherein selecting the cluster further comprises:
adjusting a resource allocated to any one of containers running in the at least some devices.

14. A non-transitory computer readable recording medium storing a computer program for causing a computer to perform the method of claim 1.

15. An edge computing system comprising:
a plurality of edge devices including a managing device,
wherein the managing device among the plurality of edge devices and fog devices is configured to:
construct a cluster including an edge device and a fog device from among a plurality of edge devices and fog devices;
select a first edge device from among the plurality of edge devices and fog devices, the first edge device executing a first application, the first application being a target of update;
select a first fog device from among the plurality of edge devices and fog devices, the first fog device being a device to distribute the first application; and
instruct an application update,
wherein the first edge device is configured to:
in response to the application update instruction, modify routing information such that a service request for the first application previously incoming to the first edge device is transmitted to the first fog device, and replace the first application with a second application which is an updated first application configured to be executed in response to the service request for the first application, while the first application is running on the first fog device, and
wherein the first fog device distributes the first application in response to the application update instruction,
wherein the managing device is further configured to:
determine network connectivity between the first edge device and the first fog device; and
exclude the first fog device from the cluster, if the result of the determining indicates that the network connectivity is below a threshold number.

16. The edge computing system of claim 15, wherein the managing device is configured to obtain resource usage of at least some devices of the plurality of edge devices and fog devices; and
determine the first edge device and the first fog device based on the resource usage.

17. The edge computing system of claim 16, wherein the managing device is configured to instruct adjustment of a resource allocated to any one of the at least some devices.

18. The edge computing system of claim 16, wherein the managing device is configured to:
obtain resource usage prediction information of the at least some devices of the plurality of edge devices and fog devices; and
determine the first edge device and the first fog device based on the prediction information.

19. The edge computing system of claim 16, wherein the managing device is configured to:
obtain information on a software stack that can be provided by the at least some devices of the plurality of edge devices and fog devices; and
determine the first edge device and the first fog device based on information on the software stack.

* * * * *